United States Patent [19]

Kawai et al.

[11] 3,772,680

[45] Nov. 13, 1973

[54] DIGITAL TRANSMISSION CHANNEL MONITORING SYSTEM

[75] Inventors: Kiyoaki Kawai; Rikio Maruta, both of Tokyo, Japan

[73] Assignee: Nippon Electric Company, Limited, Tokyo, Japan

[22] Filed: July 30, 1971

[21] Appl. No.: 167,787

[30] Foreign Application Priority Data

July 31, 1970 Japan .............................. 45/66558

[52] U.S. Cl. 340/347 DD, 325/38 A, 340/146.1 AG

[51] Int. Cl. .............................................. H041 3/02

[58] Field of Search ................................ 325/38 A; 340/347 DD, 146.1 AG

[56] References Cited

UNITED STATES PATENTS

| | | | |
|---|---|---|---|
| 3,369,229 | 2/1968 | Dorros | 325/38 A |
| 3,113,204 | 12/1963 | O'Brien | 340/146.1 AG |
| 3,518,662 | 6/1970 | Nakagome | 325/38 A |
| 3,611,141 | 10/1971 | Waters | 325/38 A |
| 3,587,088 | 6/1971 | Franaszek | 325/38 A |
| 3,493,928 | 2/1970 | Juliusburger | 340/146.1 AG |
| 3,487,363 | 12/1969 | Wall | 340/146.1 AG |
| 3,460,117 | 8/1969 | Cohn | 340/146.1 AG |
| 3,456,239 | 7/1969 | Glasson | 340/146.1 AG |
| 3,526,758 | 9/1970 | Nozawa | 340/146.1 AG |

*Primary Examiner*—Maynard R. Wilbur
*Assistant Examiner*—Jeremiah Glassman
*Attorney*—Richard C. Sughrue et al.

[57] ABSTRACT

A digital transmission channel monitoring system including means for inserting at a transmitter the equivalent of a binary signal parity check bit into each of the n-digit code words of a multi-level signal. The parity check signal is inserted directly into the multi-level code words by detecting if the algebraic sum of the levels of the digits of each code word is an even or odd number. The level of one of the digits is then selectively changed so that the algebraic sum of the levels of the digits in each word is always either an even number or an odd number. At a receiver, each code word is investigated to determine the algebraic sum of the levels of its digits and an error signal is generated when incorrect parity is detected.

12 Claims, 7 Drawing Figures

DIGITAL TRANSMISSION CHANNEL MONITORING SYSTEM

This invention relates to monitoring systems for digital transmission channels such as PCM (pulse-code modulation) transmission channels.

The superhigh speed multilevel transmission using coaxial cables is used in large capacity transmission systems which handle wideband signals such as T.V. telephone signals. In such a transmission system, the reliability of the system must be sufficiently high and the system is required to have an automatic protection switching function operable by in-service error monitoring or error detection and/or error correction.

The error monitoring techniques for a multilevel transmission may be classified into two major groups; an indirect method without resorting to the parity check, and a direct method based on the parity check. In the former method, the error is monitored by using the redundant code words which are inserted at the time of the conversion of input binary codes into multilevel codes. More specifically, in the baseband transmission using the coaxial cable, it is essential to establish the DC balance on the code train, and the binary to multilevel conversion is usually done in each code block. When, for example, the multilevel codes of each of the code blocks are composed on $n$-digit 1-level, the number ($m$) of codes corresponding to the input binary codes satisfies the condition $m < n^1$ ($n^1$: the number of all codes available in the $n$-digit 1-level codes). In other words, in the multilevel codes, there are ($n^1 - m$) number of redundant codes which do not correspond to any of inputs binary codes. Hence, by detecting the change in the redundant codes produced due to the line error or the channel fault, it is impossible to monitor the line error. This method, however, is effective only when the redundant codes occur, and not effective when the incorrect codes included in the $n^1$ multilevel codes are produced due to the line error.

As an example of the latter method, an odd (or even) parity check in the binary code train is well known. This method is applied to the binary code trains before the code conversion on the transmitter side and after the code conversion on the receiving side. However, the error caused on the adjacent level in the multilevel code block does not always cause one bit error in the binary signals after code conversion on the receiving side. For example, the even parity check of the binary code trains is ineffective on the error caused on the adjacent level causing the even bit error. This method is therefore lacking in the error detecting function.

An object of this invention is therefore to provide an efficient inservice error detecting system applicable to large capacity transmission systems.

The present invention is aimed at an improvement of the latter one of the above-mentioned methods and makes it possible to realize a simplified, highly effective line monitoring system applicable to all those code blocks in which one redundant bit can be inserted for the parity check purpose. Practically, on the transmitter side, the level of the digit into which the parity checking bit is inserted is determined so that the algebraic sum of the levels of each code block takes an even (or odd) value and, on the receiver side, the algebraic sum of the levels of each code block is calculated whereby it is detected whether it is even number or odd number, and thus the line error or the channel fault is detected.

Generally, the line error occurs between a certain level and its adjacent level in one digit of the multilevel code train. Furthermore, in a transmission system with a small error rate, the probability of two or more errors in one code block, excepting for burst error due to instantaneous interruption or other reason, is small. The number of errors in one code block is considered to be only one at most. Hence, the line can be unfailingly monitored at a high efficiency.

The invention will be more apparent from the following detailed description taken in conjunction with the accompanying drawings, wherein.

Figure 1:
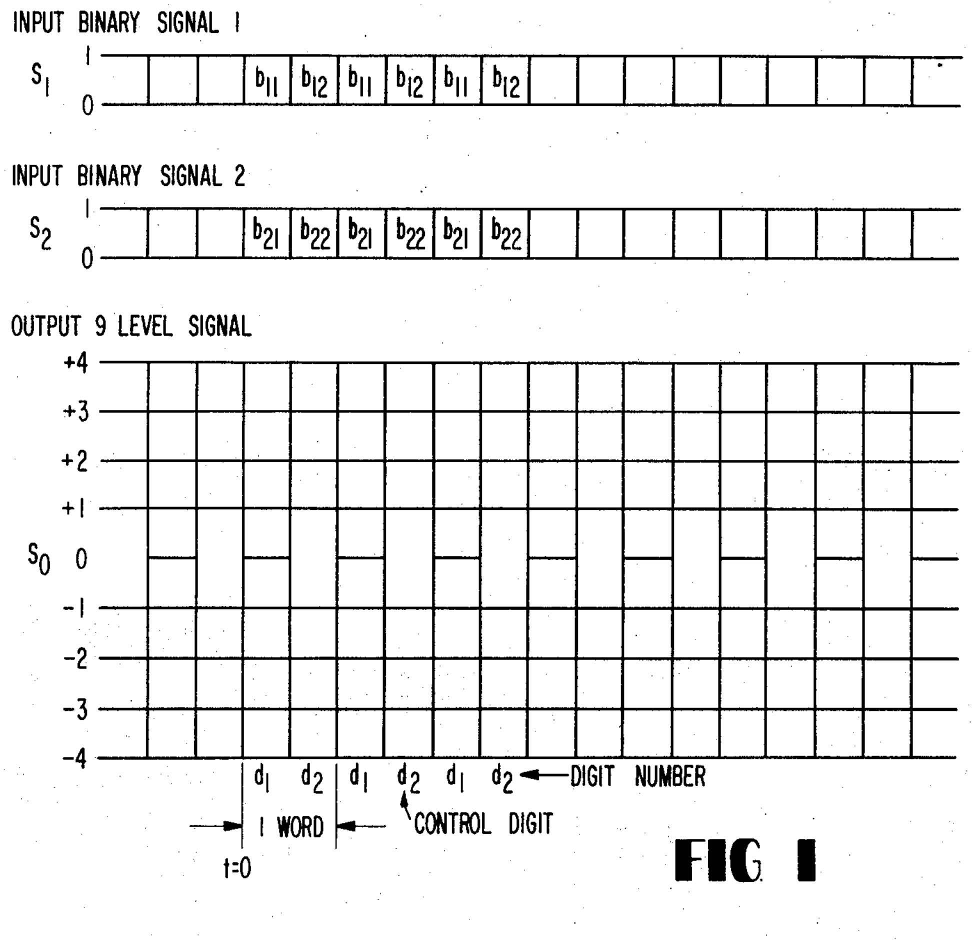
FIG. 1 shows the relationship between a binary code signals and the corresponding multilevel code signal.

Table 1 shows an example of code conversion formula on which embodiments shown in the accompanying drawings are based. Referring to FIG. 1, $S_1$ denotes an input binary code train, $S_2$ another input binary code train, and $S_0$ a 9-level code train. Four bits consisting of 2 bits of $S_1$ and 2 bits of $S_2$ are converted into 2 digits of $S_o$.

TABLE 1

| | Binary code | | | | 9-level code | | | | | |
|---|---|---|---|---|---|---|---|---|---|---|
| | $S_1$ | | $S_2$ | | Basic code | | After parity | | $S_0$ | |
| Code No. | $b_{11}$ | $b_{12}$ | $b_{21}$ | $b_{22}$ | $d_1$ | $d_2$ | $d_1$ | $d_2$ | $d_1$ | $d_2$ |
| 1 | 0 | 0 | 0 | 0 | +4 | +3 | +4 | +4 | ±4 | ±4 |
| 2 | 0 | 0 | 0 | 1 | +3 | +3 | +3 | +3 | ±3 | ±3 |
| 3 | 0 | 1 | 0 | 0 | +2 | +3 | +2 | +4 | ±2 | ±4 |
| 4 | 0 | 1 | 0 | 1 | +1 | +3 | +1 | +3 | ±1 | ±3 |
| 5 | 0 | 0 | 1 | 0 | 0 | +3 | 0 | +4 | 0 | ±4 |
| 6 | 0 | 0 | 1 | 1 | −1 | +3 | −1 | +3 | ±1 | ±3 |
| 7 | 0 | 1 | 1 | 0 | −2 | +3 | −2 | +4 | ±2 | ±4 |
| 8 | 0 | 1 | 1 | 1 | −3 | +3 | −3 | +3 | ±3 | ±3 |
| 9 | 1 | 0 | 0 | 0 | +4 | +1 | +4 | +2 | ±4 | ±2 |
| 10 | 1 | 0 | 0 | 1 | +3 | +1 | +3 | +1 | ±3 | ±1 |
| 11 | 1 | 1 | 0 | 0 | +2 | +1 | +2 | +2 | ±2 | ±2 |
| 12 | 1 | 1 | 0 | 1 | +1 | +1 | +1 | +1 | ±1 | ±1 |
| 13 | 1 | 0 | 1 | 0 | 0 | +1 | 0 | +2 | 0 | ±2 |
| 14 | 1 | 0 | 1 | 1 | −1 | +1 | −1 | +1 | ∓1 | ±1 |
| 15 | 1 | 1 | 1 | 0 | −2 | +1 | −2 | +2 | ±2 | ±2 |
| 16 | 1 | 1 | 1 | 1 | −3 | +1 | −3 | +1 | ±3 | ±1 |

Figure 2:
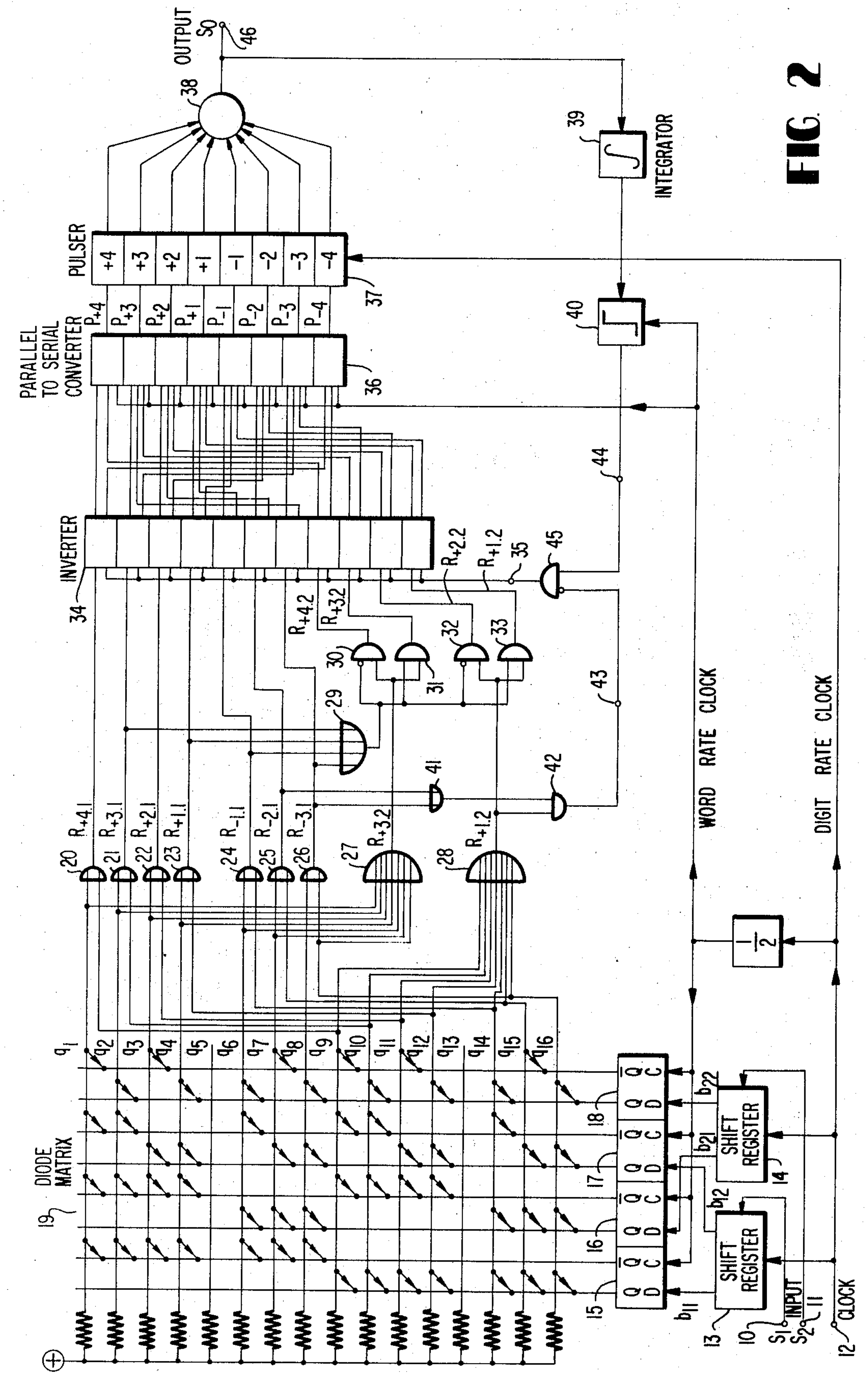
FIG. 2 shows, partly in blocks, a circuit diagram of a transmitting apparatus of an embodiment of this invention.

FIG. 2 shows a transmitter embodying this invention, in which input binary code trains are converted into a 9-level balanced code train. In FIG. 2, the reference numerals 10 and 11 denote binary code train input terminals, and 12 a digit rate clock input terminal. To facilitate the code conversion, the input binary signals $S_1$ and $S_2$ are converted, by the 2-bit shift registers 13 and 14 at the word (block) rate clock whose frequency is one-half that of the digit rate clock, to parallel codes $b_{11}$, $b_{21}$, $b_{12}$ and $b_{22}$, which are memorized in memory circuits 15 through 18 such as D-type flip-flops. Each of this four parallel codes is assigned one of 16 codes by a diode matrix 19. For example, $q_6$ takes "1" only when $S_1$ and $S_2$ correspond to 6th code in Table 1. The 6th code must be converted into $d_1$ ($=-1$) and $d_2$ ($=+3$). Therefore $q_6$ goes through OR gates 24 and 27, to make $R_{+1,1}$ and $R_{-3,2}$ "1" states. Generally, $R_{i,j}$ is a signal for designating that the level of $j$-th digit of 9-level code is $i$ state. OR gates 20 through 26 designate the level of $d_1$, and OR gates 27 and 28 the level of $d_2$. $R_{+3.1}$, $R_{+1.1}$, $R_{-1.1}$ and $R_{-3.1}$ are connected to the OR gate 29, thereby detecting that $d_1$ stands at an odd-numbered level. For the parity checking where the algebraic sum of the levels of $d_1$ and $d_2$ is even, $d_2$ code is unchanged when the output of OR gate 29 is "1" (namely, $d_1$ stands at an odd level); or when the output of OR gate 29 is "0," +3 level of $d_2$ is converted into +4level, and +1 into +2. This conversion is done in the circuit comprising inhibit gates 30, 32, AND gates 31 and 33. $R_{+4.1}, \ldots R_{-3.1}, R_{+4.2}, \ldots R_{+1.2}$ are affected polarity conversion control by the polarity inverter 34 in response to the output 35 of a work polarity control circuit in order to provide DC balance of the output code train, and then are serialized level by level by a parallel to serial circuit 36 whereby signals of $P_{+4}, P_{+3}, \ldots P_{-4}$ are formed.

Figure 3:
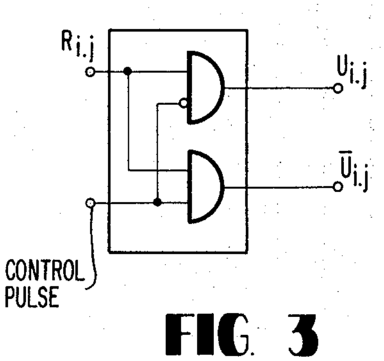
FIGS. 3 and 4 show detailed examples of the partial circuits employed in the apparatus of FIG. 2.
Figure 4:
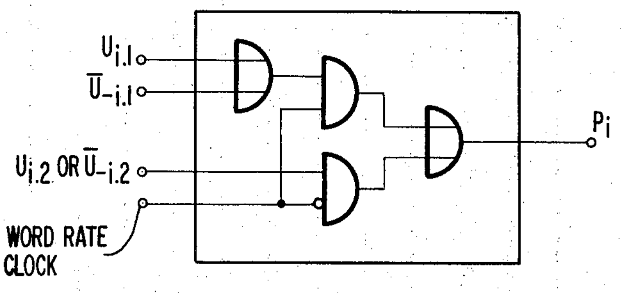

FIG. 3 shows a unit of polarity inverter 34, and FIG. 4 a unit of parallel to serial circuit 36. In FIG. 4, $P_{+3}$, for example, consists of $U_{+3.1}$ and $U_{+3.2}$ arranged in a time sequence. When one of $P_{+4}, P_{+3}, P_{+2}, P_{+1}, P_{-1}, P_{-2}$, $P_{-3}$ and $P_{-4}$ is "1," a pulser with the corresponding level among +4, +3, +2, +1, −1, −2, −3 and −4 levels is driven and summed with other level signals by the summing circuit 38 whereby a 9-level DC balanced code train is obtained at the output terminal 46. The control of the polarity inverter 34 is carried out in the following manner. The polarity of the integrated value of the 9-level output signal which have been transmitted up to the time point $t = 0$ (See FIG. 1) is compared with that of the DC component of one code word of $d_1$ and $d_2$ following the 9-level signal after the time point $t = 0$. When the two polarities are coincident with each other, the code word of $d_1$ and $d_2$ is inverted. When the polarities are not in coincidence, the code word is not inverted. In this way, the polarity is controlled so that the integrated value of 9-level output code train is converged into zero level. Thus, the output code train having no DC component can be transmitted over a system with DC cutoff characteristic. The 9-level output code train transmitted up to the time point $t = 0$ is integrated by an integrator 39, and the polarity of the integrated value is decided by a comparator 40, while, the polarity of the DC component corresponding to one code word of $d_1$ and $d_2$ is detected by an OR gate 41 and an AND gate 42. Since the DC component corresponding to one code word can be negative only when $d_1$ is −2 or −3 and $d_2$ is +1 (or +1 or +2 after parity insertion), the output 43 of the AND gate 42 becomes "1" when the DC component of the code word is negative. This "1" output and the output 44 of the comparator 40 (this comparator output becomes "1" when the DC component of the previous code train is positive) are sent into an inhibit gate 45 whereby a word polarity control output 35 is obtained.

Figure 5:
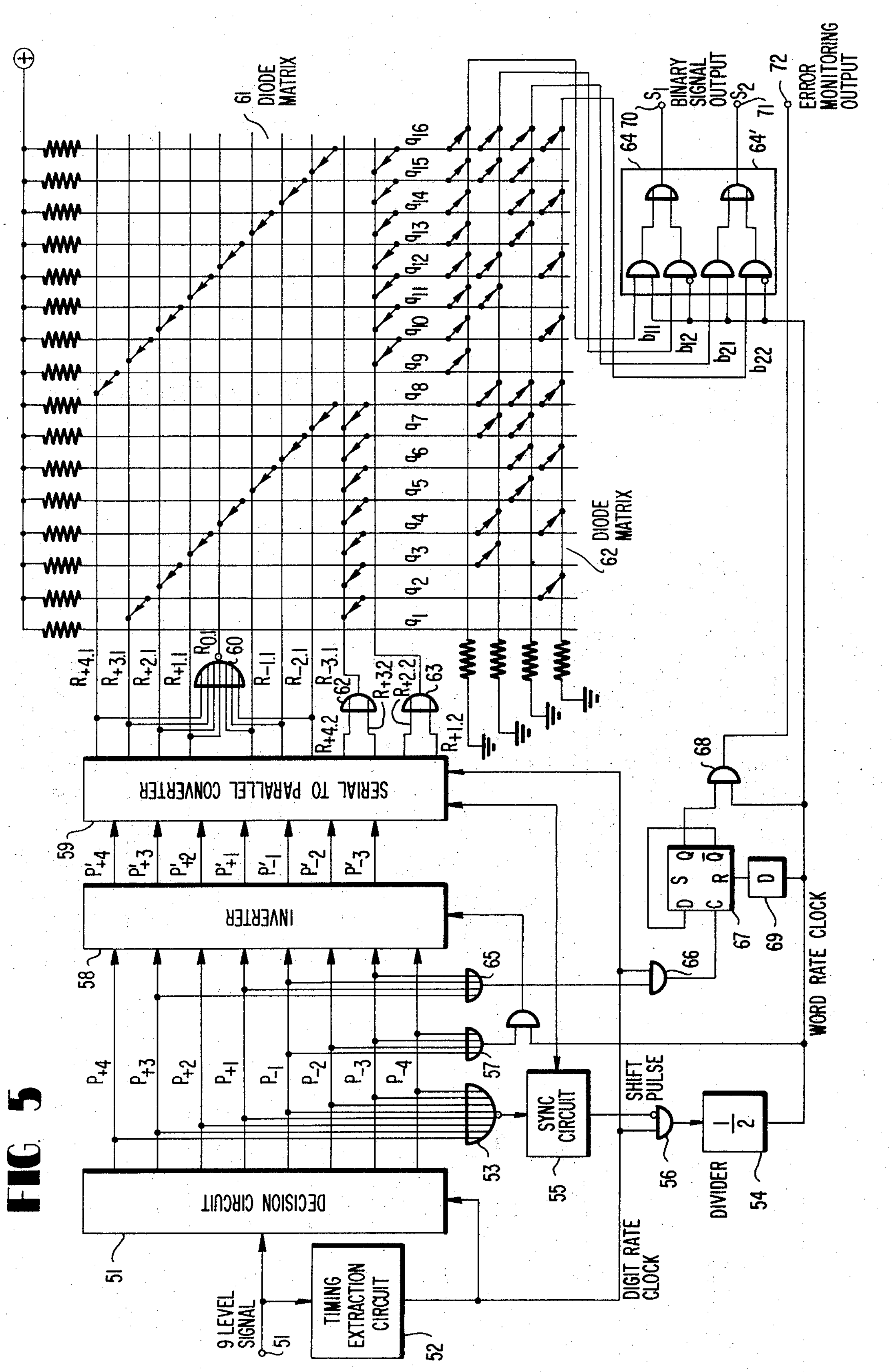
FIG. 5 shows, partly in blocks, a circuit diagram of a receiving apparatus of the embodiment.

FIG. 5 shows the reconverter on the receiving side, wherein the received and equalized input signal is applied to a 9-level decision circuit 51 and to a timing extraction circuit 52 by way of an input terminal 50. The timing extractor 52 extracts the digit rate clock, to operate the 9-level decision circuit whereby the code level of the received signal is discriminated, and "1" output is obtained over the output line corresponding to the discriminated level (e.g., $P_{+2}$ output line when the level is +2). When no output is delivered to $P_{+4}, \ldots P_{-4}$, this means that zero level is received. A NOR gate 53 generates an output when zero level is detected. The digit rate clock is divided by two by a frequency divider 54 whereby the word rate clock is formed. The word (block) synchronization is checked by a synchronizing circuit 55. When synchronization is abnormal, one bit of the digit rate clock pulse is inhibited by an inhibit gate 56, thereby shifting the word rate clock by one bit. As illustrated in FIG. 1, this synchronization check is based on the fact that no zero level occurs in the digit $d_2$. When the output of a NOR gate 53 is sampled by the word rate clock having the same phase as the digit $d_2$, the sampled result is always "0" in the normal synchronization state. While, in the abnormal synchronization state, "0" and "1" occur at random. By utilizing the difference between the two states, the synchronizing operation can be carried out. Since this operation is well known in the art, no further description will be given in the specification.

Thus, by establishing the word (block) synchronization between transmitting and receiving sides, the received signal is decoded into a binary code in the following manner. The polarity of the received multilevel code train which has been subjected to the polarity control for DC balance must be inverted into the multilevel code train with the original polarity. To do this operation, the polarity of the digit $d_2$ is checked by an OR circuit 57. When the result of checking shows negative, a polarity inverter 58 is operated to convert $P_{+i}$ into $P'_{-i}$.

Figure 6:
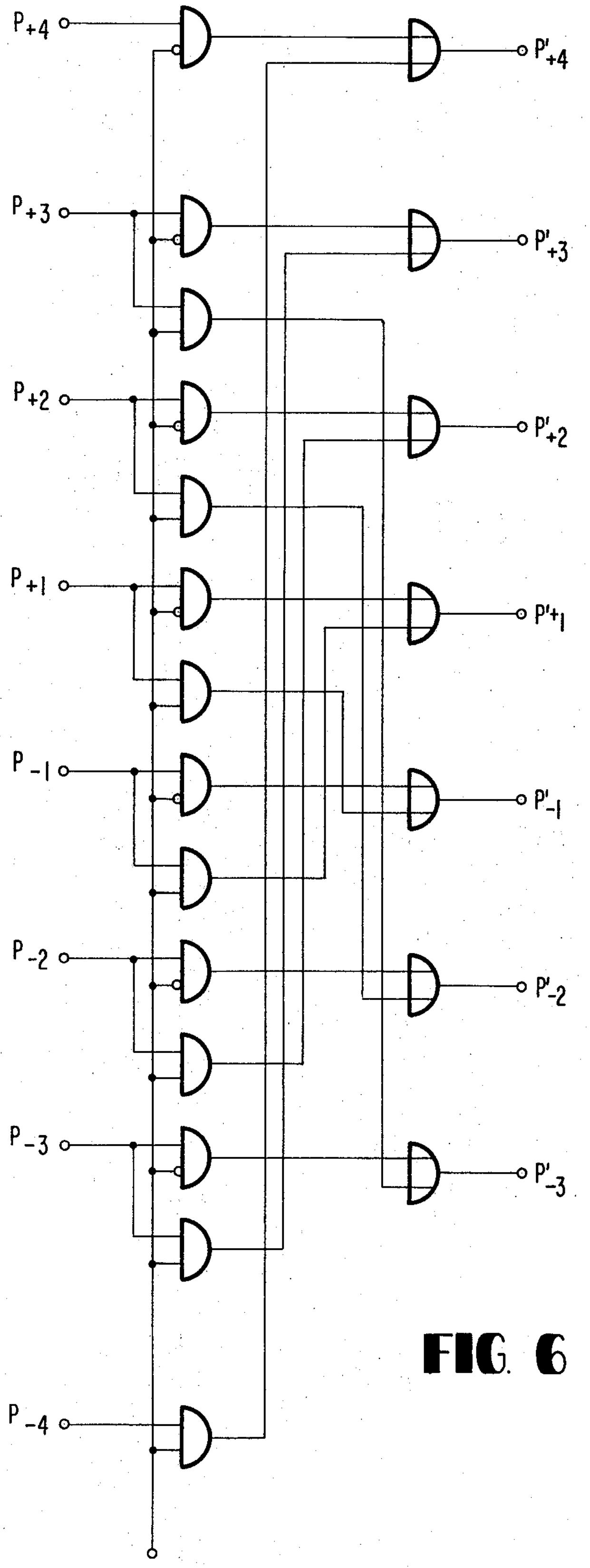
FIGS. 6 and 7 show detailed examples of the partial circuits in the device of FIG. 5.

FIG. 6 shows an example of this polarity inverter 58. After restoring the word polarity, the individual digits are separated in parallel, level by level, using the work rate clock by a serial to parallel converter 59 in order to facilitate further conversion operation.

Figure 7:
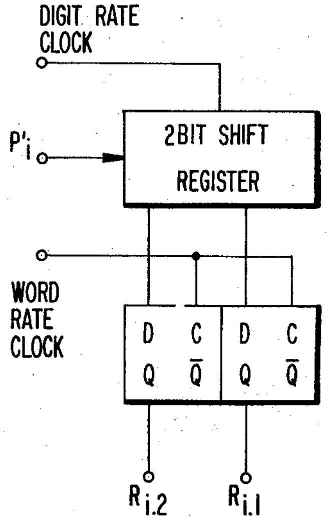

FIG. 7 shows a unit circuit of the serial to parallel converter 59. The purpose of a NOR gate 60 is to detect whether the digit $d_1$ is zero or not. When $d_1$ is zero, $R_{0.1}$ is "1." When $j$-th digit stands at the level $i$, $R_{i.j}$ is "1." Thus the outputs $R_{+4.1}, \ldots R_{-3.1}, R_{-4.2}, \ldots R_{+1.2}$ are obtained. To convert those outputs to the multilevel codes before inserting the parity check signal, $R_{+4.2}$ and $R_{+3.2}$ are treated by an OR gate 62, and $R_{+2.2}$ and $R_{+1.2}$ by an OR gate 63. Then, these outputs are converted to 16 codes $q_1$ through $q_{16}$ by the diode matrix 61. The codes $q_1$ through $q_{16}$ are then applied to a diode matrix 62, whereby parallel outputs of $b_{11}, b_{12}, b_{21}$ and $b_{22}$ according to Table 1 are generated. The binary signal output $S_1$ is obtained at a terminal 70 from $b_{11}$ and $b_{12}$ by a parallel to serial converter 64. Similarly, the binary signal output $S_2$ is obtained at a terminal 71 from $b_{21}$ and $b_{22}$ by a parallel to serial converter 64'. Among the outputs of the decision circuit 51, $P_{+3}, P_{+1}$, $P_{-1}$ and $P_{-3}$ corresponding to the odd-numbered level are applied to an OR gate 65 and then sampled by an AND gate 66 using the digit rate clock. The state of a flip-flop 67 immediately before its being reset is read by an AND gate 68 whereby an error detection output 72 is obtained. A delay line 69 delays the word rate clock to apply this delayed pulse to the flip-flop 67 for the purpose of reading its state immediatedly before its being reset. It is apparent that the flip-flop 67 functions as a binary counter because the states of the Q and $\overline{Q}$ outputs thereof are inverted alternately every time the input pulse is supplied from the gate 66 to the C input thereof. When the odd parity checking is done on the transmitter side, the $\overline{Q}$ terminal of the flip-flop may be read whereby the error can be monitored.

As has been described above, the invention makes it possible to realize a simplified, highly efficient channel monitoring system capable of the even or odd parity check depending on the algebraic sum of levels of one code words.

What is claimed is:

1. A digital transmission channel monitoring system comprising:

a transmitting apparatus including, means for converting at least one binary signal into a multilevel code signal with code words each having *m*-level (where *m* is an integer greater than two and *n* is an integer greater than one) codes in which one bit can be inserted for the parity checking, means for detecting whether the algebraic sum of the levels of the individual digits of each of said code words is in the even or odd number, and means for inserting said one parity bit into each of said code words so that said algebraic sum is always on even or odd number depending on the outputs of said detecting means; and a receiving apparatus including;

means for extracting a digit rate clock pulse from a received multilevel code signal, means for discriminating said received multilevel code signal by using said digit rate clock pulse, means for generating a word rate clock pluse from said digit rate clock pulse, means for obtaining a word synchronizing signal from the output of said discriminating means, means for converting said received multilevel code signal into at least one binary code signal by using said digit rate clock, the output of said discriminating means, said word rate clock, and said word synchronizing signal; and means for detecting whether the algebraic sum of each *n*-digit multilevel code in said received multilevel code signal is in the even or odd number as determined at the corresponding transmitting apparatus.

2. A transmitter including digital transmission channel monitoring apparatus comprising;

means for converting at least one binary signal into a multi-level code signal of *m*-level n-digit code words, where *m* is an integer greater than one, means for detecting if the algebraic sum of the levels of the digits in each code word is an even or odd number, and means for selectively changing the level of one of the digits in each code word so that said algebraic sum is always an even number or always an odd number.

3. The transmitter of claim 2 wherein said means for converting includes means for converting two binary signals into a single multi-level code signal of n-digit code words, and includes means for generating signals representing the levels of the digits of said code words, said means for detecting being responsive to said generated signals, said means for selectively changing including means for suppressing a selected one of said generated signals and for generating a substitute signal representing a different level whereby the algebraic sum of the levels of the digits in each word is always either an even number or an odd number.

4. The transmitter of claim 3 further including means for transmitting the multi-level code signal, means for integrating the transmitted multi-level code signal to provide an indication of the D.C. level of the transmitted code signals, means for determining the polarity of said integrated code signal, means for determining the polarity of the algebraic sum of the levels of the digits in each additional code word, means for comparing the two determined polarities and means, responsive to said compare means, for inverting said additional code word prior to transmission when the compared polarities are the same.

5. The transmitter of claim 4 wherein said means for converting two binary signals into a single multi-level signal further comprises, first and second shift registers each storing n-bits, said first shift register receiving said first binary signal, said second shift register receiving said second binary signal, a diode matrix receiving in parallel the contents of said first and second shift registers and producing an output indicative of an n-digit multi-level code word, said means for generating signals representing the levels of the digits in each code word comprising gate means, responsive to the outputs of said diode matrix, for generating a parallel array of signals representing the levels of the digits in each code signal.

6. The transmitter of claim 5 wherein $n$=2 and wherein the level of one of the digits in each code word is initially selected as an odd number, said means for determining the algebraic sum including, OR gate means, coupled to said means for generating, for receiving only signals representing an odd valued level and logic means responsive to the output of said OR gate means and receiving signals representative of the level of the digit whose level is initially selected as an odd number, for suppressing the signals representing odd valued levels of said initially selected digit and generating in its place a signal representing an even valued level when the output of the OR gate indicates that the other digit in the code word is at an even valued level.

7. In a digital transmission channel monitoring system which includes a transmitter transmitting *m*-level *n*-digit code words where *m* is an integer greater than two and *n* is an integer greater than one, each code word having the level of one of its digits selectively changed such that the algebraic sum of the levels of the digits in each code word is always an even number or always an odd number, a receiver comprising, means for receiving said multi-level *n*-digit code words, means for detecting for each code word, if the algebraic sum of the levels of the digits in the word is an even or odd number, and means for producing an error signal when the algebraic sum is not always an even number or always an odd number as required by the transmitter.

8. A digital transmission channel monitoring system comprising a transmitting apparatus including, means for converting two binary signals into an *m*-level code signal of two digit code words where *m* is an integer greater than two, means for detecting if the algebraic sum of the levels of the digits in each code word is an even or an odd number and means for providing a parity check bit in each word by selectively altering the level of one of the digits in each word so that the algebraic sum of the levels of the digits in the words are always an even number or always an odd number.

9. The monitoring system of claim 8 wherein the level of said one digit is initially always selected as an odd number, said means for providing a parity check bit at said transmitter includes, means for detecting if the level of the other digit is an even number or if it is an odd number and for altering the level of said one digit to an even number when the level of the other digit is determined to be an even number whereby the algebraic sum of the levels of the first and second digits in each word is always an even number.

10. The monitoring system of claim 9 further including receiver means for receiving the m-level code words said receiver means including, coincidence gate means receiving only signals representative of odd level digits and clock signals representing the digit rate and bistable circuit means receiving the output of said coincidence gate means for producing an error signal indicative of receiving signals representing an odd and an even level over one code word period.

11. The monitoring system of claim 8 wherein the level of said one digit is initially selected as an even number, said means for providing a parity check bit at the transmitter including;

means for detecting if the level of the other digit is an even number or if it is an odd number and for altering the level of said one digit to an odd number when th level of the other digit is determined to be an even number whereby the algebraic sum of the levels of the first and second digits in each word is always an odd number.

12. An odd-even decision circuit for delivering a decision signal indicating if the algebraic sum of the levels in each word of a multilevel code signal is an odd number, comprising:

means (51) for discriminating the level of each of the digits of said multilevel code signal to deliver binary discrimination signals corresponding to the levels of said multilevel code signal;

an OR gate (65) for generating OR outputs of the discrimination signals corresponding to odd levels;

an AND gate (66) for generating AND outputs of said OR outputs and a digit rate clock signal of said multilevel code signal;

a binary counter (67) being reset by said word rate clock signal for counting said AND outputs in a binary form at each word of said multilevel code signal to deliver said decision signal from the outputs thereof.

* * * * *

UNITED STATES PATENT OFFICE

CERTIFICATE OF CORRECTION

Patent No. 3,772,680 Dated November 13, 1973

Inventor(s) Kiyoaki KAWAI et al

It is certified that error appears in the above-identified patent and that said Letters Patent are hereby corrected as shown below:

In the Abstract, line 8 - Before "odd number" insert -- an --

Col. 1, line 34 - After "it is" delete "impossible" and substitute -- possible --

Col. 2, line 67 - Delete "$R_{+1,1}$" and substitute -- $R_{-1,1}$ -- line 67 - Delete "$R_{-3,2}$" and substitute -- $R_{+3,2}$ --

Col. 3, line 15 - Before "polarity" delete "work" and substitute -- word --

Col. 4, line 34 - After "using the" delete "work" and substitute -- word -- line 41 - Delete "$R_{-4 \cdot 2}$" and substitute -- $R_{+4 \cdot 2}$ --

Col. 5, line 8 - After "code" delete "words" and substitute -- word -- line 15 - After "m-level" insert -- n-digit -- line 26 - Indent subparagraph "a receiving apparatus including;"

line 48 - After "than" and before "one," insert -- two and n is an integer greater than --

Col. 8, line 8 - After "when" delete "th" and substitute -- the -- line 17 - After "means" delete "(51)"

line 21 - After "gate" delete "(65)"

line 23 - After "gate" delete "(66)"

line 26 - After "counter" delete "(67)"

Signed and sealed this 16th day of April 1974.

(SEAL)
Attest:

EDWARD M.FLETCHER,JR.
Attesting Officer

C. MARSHALL DANN
Commissioner of Patents